United States Patent [19]

Fazio et al.

[11] Patent Number: 4,778,169
[45] Date of Patent: Oct. 18, 1988

[54] FEEDERS FOR SHEETLIKE ARTICLES

[75] Inventors: Dominick Fazio, Denville; Peter K. Schutz, Summit, both of N.J.

[73] Assignee: Ziyad, Inc., Denville, N.J.

[21] Appl. No.: 35,668

[22] Filed: Apr. 8, 1987

[51] Int. Cl.⁴ .............................................. B65H 5/00
[52] U.S. Cl. ...................... 271/10; 271/265; 271/272; 198/464.1; 324/226
[58] Field of Search ............... 324/226; 198/464.1; 271/265, 272-274, 10

[56] References Cited

U.S. PATENT DOCUMENTS

| | | | |
|---|---|---|---|
| 3,411,768 | 11/1968 | Gatti | 271/272 |
| 3,487,306 | 12/1969 | Harmer | 324/67 |
| 3,521,880 | 7/1970 | Shebanow et al. | 271/265 |
| 3,906,357 | 9/1975 | Runshang | 324/226 |
| 4,192,495 | 3/1980 | Heinzelmann et al. | 271/10 |
| 4,548,394 | 10/1985 | Koyama et al. | 271/272 |
| 4,573,673 | 3/1986 | Haug | 271/265 |
| 4,587,486 | 5/1986 | Soyck | 324/226 |
| 4,621,802 | 11/1986 | Ishida et al. | 271/272 |

FOREIGN PATENT DOCUMENTS

| | | | |
|---|---|---|---|
| 1100538 | 5/1981 | Canada | 271/265 |
| 6015337 | 1/1985 | Japan | 271/10 |

*Primary Examiner*—H. Grant Skaggs
*Attorney, Agent, or Firm*—Lerner, David, Littenberg, Krumholz & Mentlik

[57] ABSTRACT

A feeder for supplying sheetlike items such as envelopes or the like to a processing machine such as an office printer. The feeder may employ a pickup such as a coil for detecting a change in magnetic field to thereby detect operation of an intake device in the processing machine. The feeder may pass an item downstream into the processing machine in response to such detection. The feeder may be arranged to move each item into a ready position and then advance each item downstream from the ready position while permitting realignment of the item by the processing machine.

14 Claims, 6 Drawing Sheets

FEEDERS FOR SHEETLIKE ARTICLES

BACKGROUND OF THE INVENTION

The present invention relates to feeders for feeding sheet like articles into processing machines.

Modern office equipment includes numerous machines which process sheet like items such as paper sheets, envelopes and the like. Examples of such sheet processing machines include photocopiers, printers associated with computers and optical character recognition devices. The sheet processing machine usually incorporates a magazine or reservoir for the sheetlike articles, and the machine ordinarily takes sheets in sequence from the magazine. Many of these processing machines also include a manual feed port and an item intake device associated with the port for taking items inserted via the port and passing such items into the internal paper path of the processing machine. Manual feed ports of this type ordinarily are used to supply sheetlike items which are needed only occasionally or items which, because of their physical configuration, cannot be processed by the internal mechanism associated with the magazine. Thus, postcards, envelopes or special letterhead may be inserted into the manual feed port of a computer printer or copier when required.

Although manual feed ports of this nature provide a useful adjunct to operation of the various machines, there are many instances in which use of the manual feed port is inconvenient. Where a secretary is printing ordinary business letters with a typical word processing computer and printer, the secretary must stop work at the keyboard to insert an envelope into the manual feed port of the printer after each letter. The secretary thus loses considerable time and productivity. There has accordingly been a substantial need heretofore for apparatus which can automatically perform the function of inserting envelopes into the manual feed port when required. There are similar needs for devices to automatically insert other sheet like items into similar manual feed ports on other office machines. However, no truly satisfactory automated feeder has been available heretofore for this purpose.

There are considerable difficulties in automating this function. The intake device within the processing machine is arranged to accept an item only when the intake device is actuated by a signal from the control unit of the machine, so as to synchronize the advance of the manually fed item with operation of the machine. Therefore, operation of an automatic feeder associated with the manual feed port must be synchronized with actuation of the intake device of the processing machine. However, a feeder which requires disassembly or modification of the processing machine, or connection to any internal components of the processing machine during installation would be undesirable at best and unacceptable in most office installations. Such a feeder would require the services of a skilled technician for installation, and the disassembly or connection required may void the manufacturer's warranty on the processing machine.

Also, each item passing into the processing machine item must be oriented so that an edge of the item is parallel to the direction of motion within the machine. The intake device incorporated in the processing machine arranged to accept items slightly out of orientation and guide each item to the appropriate predetermined orientation as the item passes downstream into the machine. This system works well for items which are inserted into the feed port manually, and which are therefore free for reorientation by the intake device. However, these intake devices are not well suited to accept items from an automated feed device upstream of the manual port. Typical automated feed devices control the orientation of the item with respect to the feed device, so that the item cannot be oriented by the intake device.

Moreover, any feeder for use with the manual feed port must reliably advance items into the feed port when required, and should be capable of feeding items in quick succession so that the feeder does not delay operation of the processing machine. The feeder desirably should be inexpensive and reliable.

No truly satisfactory feeder meeting these conditions has been available heretofore, and there have accordingly been substantial unmet needs for such a feeder.

SUMMARY OF THE INVENTION

The present invention meets those needs.

One aspect of the present invention incorporates the realization that the electrical components utilized to actuate the intake devices at the manual feed port of typical processing machines generate significant changes in magnetic field when the intake device is actuated. For example, one very common form of intake device includes a roller and a solenoid arranged to move the roller upon actuation of the intake device. Operation of this solenoid provides a significant change in magnetic field. According to this aspect of the present invention, the feeder is provided with detector means for detecting a change in magnetic field incident to actuation of the intake device. The detector means is arranged to provide a detecting signal in response to this change. The feeder also includes assist means for assisting the advance of an item into the intake device in response to the detection signal. The detector means may include a pickup for sensing the magnetic field and means for mounting the pickup outside of the processing machine. The pickup may incorporate a sensing conductor such as a coil of wire and circuit means for detecting voltage surges induced in the conductor by changes in the magnetic field. Such a pickup can be mounted to the outside housing of the processing machine by facile means such as adhesive tape, metal clip or the like. No disassembly or modification of the processing machine, and no internal connection within the processing machine, is required to synchronize the feeder with the intake device of the processing machine. This greatly simplifies installation of the feeder, and permits installation by non-technical personnel. The circuit means may include debounce means for discriminating between those changes in magnetic field caused by genuine actuation of the intake device and spurious signals caused by electrical or magnetic interference in the environment.

According to a further aspect of the invention, the feeder may include a frame defining a path having upstream and downstream directions, the frame being adapted for mounting adjacent the processing machine with the downstream end of the path adjacent the intake device of the processing machine. The feeder preferably includes supply means for advancing a plurality of sheetlike items one by one downstream along the path to a predetermined ready position, with each item in orientation corresponding generally to the predetermined orientation established by the processing machine. That is, the supply means supplies each item in an orientation close to the final orientation which the item will have after reorientation by the intake device of the processing machine. Assist means are provided for urging each item downstream from the ready position into the intake device of the processing machine without substantially constraining the orientation of the item as the item passes downstream from the ready position. Because the orientation of each item is substantially unconstrained as it leaves the feeder and moves into the intake device of the processing machine, the intake device can reorient the item as required in much the same way as the intake device orients items supplied manually. Therefore, the feeder will not interfere with operation of the intake device, and the feeder need not be precisely aligned with the processing machine. In preferred embodiments, the feeder can be aligned with the processing machine simply by placing the feeder on a tabletop adjacent the machine, thus further simplifying installation.

The feeder preferably includes a drive element such as a drive roller having a drive surface, the drive element being movably mounted to the frame so that the drive surface is adjacent the item path. Drive element movement means are provided for moving the drive element so that the drive surface moves downstream. The assist means may include assist bias means for biasing each time against the drive element with a predetermined, typically low assist bias force when the item is at or downstream of the ready position. The supply means may include supply bias means for biasing each item against the same drive surface with a supply bias force greater than the assist bias force while the item is upstream of the ready position. Thus, the drive element serves both to move each item downstream to the ready position and to urge the item downstream from the ready position. The relatively high supply bias force assures that each item will be firmly engaged wtih the drive surface and hence positively fed to the ready position, whereas the relatively low assist bias force applied to each time as the item passes into the intake device facilitates reorientation of the item by the intake device in the processing machine.

Preferably, control means are provided for stopping the motion of the drive element when an item is at the ready position and restarting movement of the drive element upon actuation of the intake device in the processing machine. These control means may be provided with the detector arrangement mentioned above, so as to sense electrical actuation of the intake device by detecting the magnetic field change. Thus, each item will be advanced to the ready position and will dwell at the ready position until the intake device is actuated to accept the item. Typically, the ready position is selected so that the leading edge of an item in the ready position projects downstream from the frame and into the intake device of the processing machine whereas a trailing portion of the item overlies the drive surface. Upon actuation of the intake device, the intake device can engage the leading portion of the item and urge the item into the processing machine. The drive roller and assist bias means will aid in this movement. Such assistance is useful inasmuch as the intake device of the processing machine usually does not firmly engage the item until after the item has been reoriented. The assistance provided by the feeder thus replaces the normal manual assistance provided by an operator feeding an item into the manual feed port.

The supply means ordinarily includes reservoir means disposed remote from the drive roller for holding a plurality of items to be fed and picker means for taking a single item from the plurality of items and advancing each such item downstream towards the drive element. Desirably, the apparatus includes outfeed detector means for detecting movement of an item downstream from the ready position and actuating the picker means to advance the next item towards the drive element upon such downstream movement. The drive element movement means preferably includes assist movement means for moving the drive surface at a predetermined assist speed as each item is advanced downstream from the ready position, and the picker means preferably is arranged to advance each item downstream towards the drive element at a speed greater than the assist speed. Also, the drive element movement means may include supply movement means for moving the drive surface at a predetermined supply speed greater than the assist speed as an item moves downstream to the ready position. Thus, although the drive element moves at a relatively slow assist speed compatible with the intake device operation while assisting an item from the ready position into the intake device, the next item will be advanced rapidly downstream from the reservoir to the drive element, and rapidly advanced further downstream by the drive element to the ready position. Therefore, the feeder can present items in rapid succession.

The supply bias means may include a carrier mounted to the frame for movement between an engaged position proximate to the drive surface and a disengaged position remote from the drive surface. Carrier bias means may be provided for urging the carrier towards the engaged position, and bias selector means may be provided for temporarily holding the carrier in the disengaged position. A supply bias element such as a roller may be mounted to the carrier so that the suppply bias element will move towards and away from the drive element with the carrier. The assist bias means may include an assist bias element also mounted to the carrier, the assist bias means being movable relative to the carrier in directions towards and away from the drive element. Appropriate means, preferably including the weight of the assist element itself, are provided for biasing the assist bias element relative to the carrier towards the drive element. When the carrier is held in the disengaged position, the assist bias element is gently urged towards the drive element and hence will gently bias items towards the drive surface on the drive element. When the carrier is not held at the disengaged position, the carrier and hence the supply bias means is urged towards the drive element under the full force of the carrier bias means, so that the supply bias element will firmly bear on any item disposed between the supply bias element and the drive element. Thus, the desired different levels of assist bias and supply bias are provided with a single carrier.

In a particularly preferred arrangement, the carrier includes a carrier shaft extending laterally across the path above the drive element, and the supply bias element includes one or more rollers rotatably mounted on this shaft. The assist bias element may be a tubular roller loosely encircling the carrier shaft, so that the assist bias roller is rotatable about the carrier shaft and movable over a limited range transversely to the carrier shaft.

This arrangement provides an extraordinarily simple and reliable way of applying the relatively light assist bias so as to urge each item against the drive surface of the drive element or roller and the item passes downstream from the ready position. Moreover, because the assist bias roller is loosely engaged on the carrier shaft, the assist bias roller is free to swing over a limited angular range. This freedom of angular motion facilitates reorientation or turning motion of items engaged between the assist bias roller and the drive element, and hence facilitates operation of the intake device in the processing machine.

These and other objects, features and advantages of the invention will be more readily apparent from the detailed description of the preferred embodiments set forth below, taken in conjunction with the accompanying drawings.

DETAILED DESCRIPTION OF THE PREFERRED EMBODIMENTS

A feeder in accordance with one embodiment of the present invention includes a frame 10 having a left hand side wall 12 and a right hand side wall 14. The frame also has feet 16 and standoffs 18 for holding an exterior cover (not shown). A generally planar platform 20 extends substantially horizontally between side walls 12 and 14 adjacent the forward or downstream end 22 of frame 10. A rear chute wall 24 extends between side walls 12 and 14. Rear chute wall 24 slopes downwardly to its forward end 26 from above platform 20, the forward end 26 of chute wall 24 being positioned slightly upwardly and to the rear of the rear edge 28 of platform 20.

A barrier wall 32 is disposed forwardly of rear chute wall 24 and slopes downwardly and rearwardly. A curved guide surface 34 (FIG. 4) is provided at the lower end of forward barrier wall 32. Rear chute wall 24, barrier wall 32 and the side walls 12 and 14 thus cooperatively define a bin or reservoir 36 which, in the feeder shown, is dimensioned to hold a stack of envelopes 38. Spacers 40 are provided for narrowing the bin slightly so as to keep the envelopes 38 in a uniform stack.

Figure 3:
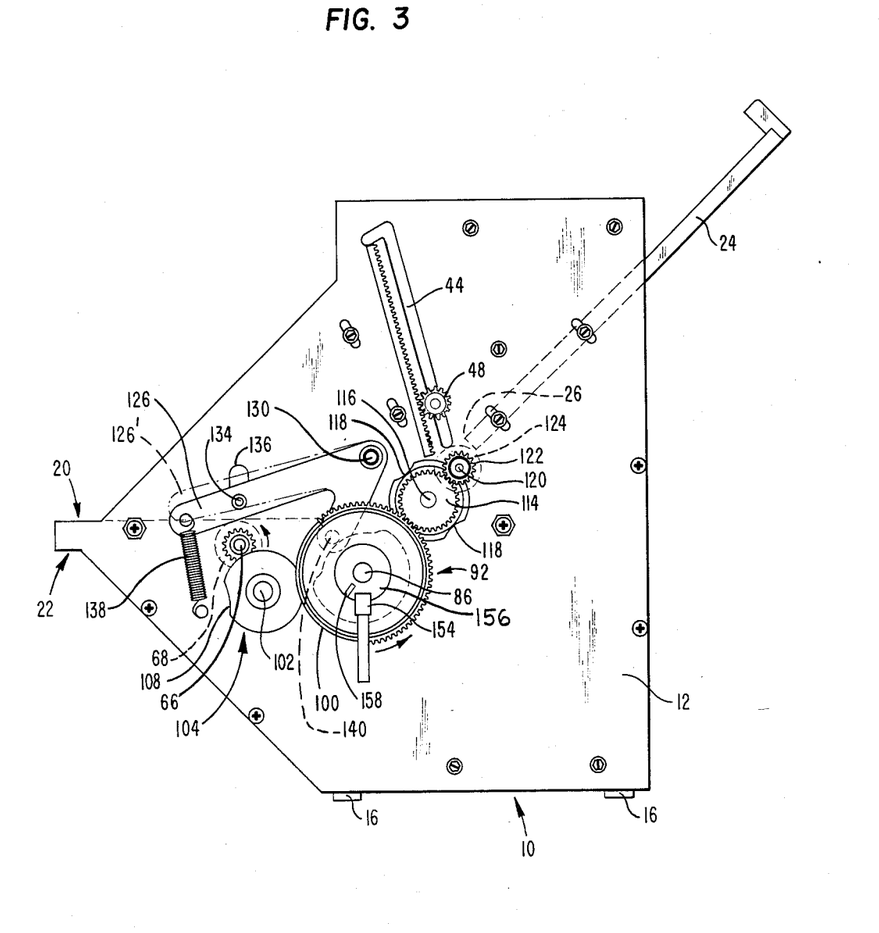
FIGS. 3 and 4 are elevational views showing opposite sides of the feeder illustrated in FIGS. 1 and 2.
Figure 4:
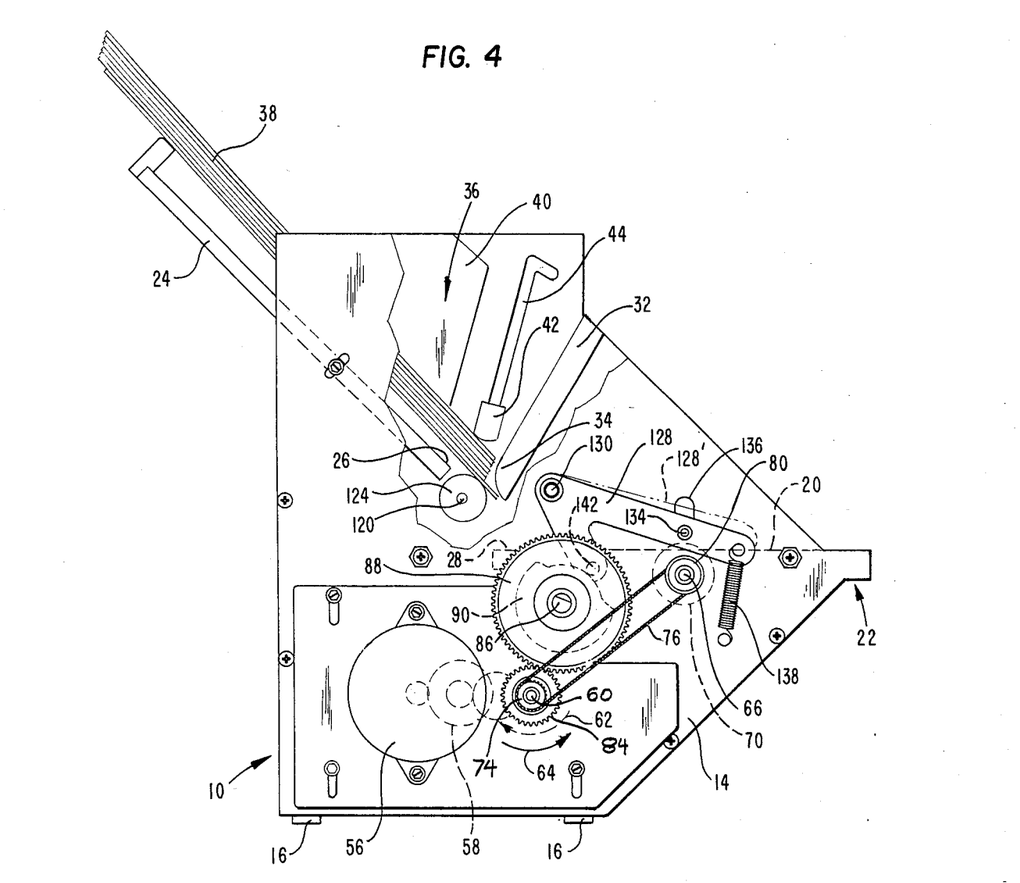

Platform 20 and side walls 12 and 14 define a path leading downstream from bin 36, the downstream end of the path corresponding to the forward or downstream end 22 of frame 10. The terms "lateral" and "laterally" are used in this disclosure as referring to directions transverse to the path defined by the frame. In the embodiment shown, the lateral directions are the directions from one of the side walls 12 and 14 to the other one of such side walls. Also, the terms "upward," "downward," "above" and "below" are used in this disclosure as describing the positions or orientations of various elements of the apparatus. These terms should be understood as referring to the positioning or orientation of the apparatus elements when the apparatus is in its normal, upright position. In the normal upright position of the feeder shown in the drawings, feet 16 are at the bottom and the direction towards the top of the sheet in each of FIGS. 3 and 4 is the upward direction.

A weight 42 is disposed within bin 36, and the weight is provided with guide pins (not shown) extending through a slot 44 in side wall 12 (FIGS. 1, 3 and 4) and a similar slot 46 (FIG. 2) in the other side wall 14. Weight 42 also is provided with a pair of pinions 48 and 50 disposed laterally outboard of the side walls 12 and 14. These pinions are rigidly connected to one another by a shaft (not shown) passing through weight 42, the pinions and shaft being rotatable as a unit with respect to the weight. Pinion 48 is in mesh with a rack 52 mounted to side wall 12 adjacent slot 44, whereas pinion 50 is in mesh with a corresponding rack 54 mounted to side wall 14. This arrangement allows weight 44 to move upwardly and downwardly within the bend along slots 44 and 46, but prevents the weight from cocking.

A stepper motor 56 is mounted to frame 10, and connected via reduction gearing 58 to a laterally-extensive power shaft 60, which is rotatably mounted to the frame. Motor 56 is reversible, and hence can drive power shaft 60 either in the assist direction indicated by broken line arrow 62 in FIG. 4 or in the opposite, supply direction indicated by solid line arrow 64 in the same figure.

Figure 5:
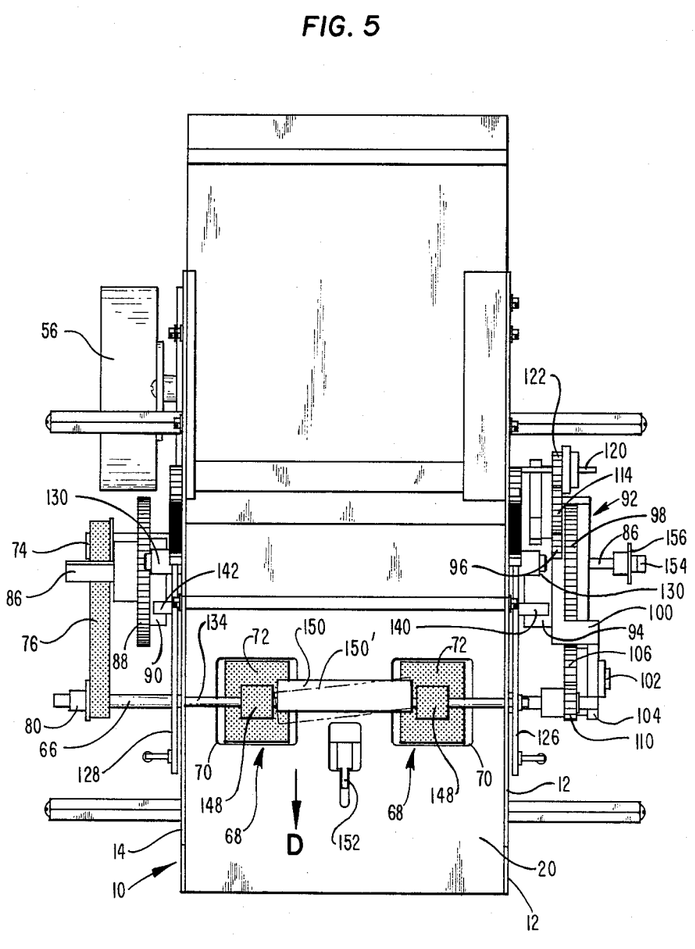
FIG. 5 is a top view of the feeder shown in FIGS. 1-4.

A drive roller shaft 66 extends laterally through frame 10 beneath platform 20. A pair of rubber covered drive rollers 68 are fixed to drive roller shaft 66. Each drive roller 68 is aligned with a hole 70 in platform 20, so that the peripheral or driving surface 72 of each drive roller is exposed at the top surface of platform 20. A pulley 74 is fixed to power shaft 60 and connected by a toothed timing belt 76 to assist pulley 80. Assist pulley 80 is connected to drive roller shaft 66 by internal clutch elements so that rotation of pulley 80 in the clockwise direction as seen in FIG. 4 will be transmitted to drive roller shaft 66, whereas the opposite rotation of sprocket 80 will not be transmitted to shaft 66. Thus, rotation of power shaft 60 in the assist or clockwise direction seen in FIG. 4 (arrow 62) will be transmitted through belt 76 and pulley 80 to shaft 66 and hence to drive roller 70, moving the top or exposed portion of peripheral 72 downstream, in the direction indicated by arrow D in FIG. 5. There is a predetermined assist movement ratio between rotation of power shaft 60 in assist direction 62 and downstream movement of the roller peripheral surface 72.

A supply power gear 84 is mounted on power shaft 60, gear 84 being connected to the power shaft by internal clutch elements arranged so that rotation of power shaft 60 in supply direction 64 will cause this gear to rotate, but the opposite rotation of the power shaft will not be transmitted to this gear. A countershaft 86 extends laterally through the frame, and a large gear 88 is fixed to the countershaft so that gear 88 is in mesh with gear 84. Gear 88 has a cam surface 90 (FIGS. 4 and 5) on the inward face of the gear, adjacent frame side wall 14.

At the opposite end of countershaft 86, adjacent side wall 12, there is a unitary gear and cam unit 92, which is also fixedly mounted to shaft 86. Unit 92 includes a cam surface 94 (FIG. 5), an inner partial or sector gear 96 and an outer partial or sector gear 98. Gear and cam unit 92 also includes arcuate holding cam surfaces 100. An intermediate shaft 102 extends laterally outwardly from frame side wall 12, and an intermediate supply gear unit 104 is rotatably mounted on shaft 102. Unit 104 has teeth 106 aligned with outer sector gear 98 on unit 92, and also has a C-shaped cam 108 aligned with a circular cam surface 100 on unit 92. A supply drive pinion 110 is mounted to the end of drive roller shaft 66, the teeth on pinion 110 meshing with teeth 106 on unit 104. Pinion 110 is connected to drive roller shaft 66 by internal unidirectional clutch elements within the pinion so that rotation of pinion 66 in the counterclockwise direction as seen in FIG. 3 will cause shaft 66 and hence drive rollers 68 to rotate, but so that pinion 110 can rotate freely in the opposite direction relative to shaft 66.

A picker intermediate gear assembly 114 is rotatably mounted to frame side wall 12 by a shaft 116, so that the gear teeth on picker intermediate gear assembly 114 are aligned with the inner sector gear 96 on unit 92. Picker intermediate gear assembly 114 also has C-shaped holding cam surfaces 118 adapted to engage a circular cam surface 100 on gear and cam unit 92. A picker shaft 120 extends laterally through frame 10 slightly below the forward edge 26 of rear chute wall 24. A picker pinion 122 is mounted on picker shaft 120 so that picker pinion 122 is in mesh with the teeth of picker intermediate gear assembly 114. Picker pinion 122 is connected to picker shaft 120 by internal overrunning clutch elements so that rotation of pinion 122 counterclockwise as seen in FIG. 3 will be transmitted to picker shaft 120 but so that the opposite rotation will not be transmitted. Picker shaft 120 can overrun or rotate in the counterclockwise direction as seen in FIG. 3 while picker pinion 122 is stationary. A rubber covered picker roller 124 is fixed to picker shaft 120. Picker roller 124 is disposed adjacent the bottom edge 26 of rear chute wall 24, and immediately beneath curved guide surface 34, so that the peripheral surface of picker roller 124 contacts the lowermost envelope in a stack of envelopes 38 disposed in bin 36.

A pair of arms 126 and 128 are mounted to frame side walls 12 and 14, respectively by studs 130 (FIGS. 3, 4 and 5) so that both arms can swing relative to the frame about a laterally extensive axis. A carrier shaft 134 is fixed to arms 126 and 128 and extends laterally therebetween through slots 136 in frame side walls 12 and 14. Shaft 134 passes above platform 20 and is substantially aligned with drive roller shaft 66. Biasing tension springs 138 are engaged with the frame and arms for urging arms 126 and 128 towards the engaged position illustrated in solid lines in the drawings, in which shaft 134 is adjacent platform 20 and hence adjacent the drive surfaces 72 of drive roller 68. Arm 126 is provided with a cam follower 140 engaged with cam surface 94 of unit 92 adjacent the frame side wall 12, whereas the opposite arm 128 is provided with a similar cam follower 142 engaged with cam surface 90 on large gear 88. These cam surfaces are arranged to swing arms 128 and 126 between the engaged position illustrated in solid lines to a disengaged position shown in broken lines at 128' in FIG. 4 and at 126' in FIG. 3. As the arms move from the engaged position to the disengaged position, carrier shaft 134 moves upwardly, away from platform 20 and away from the drive surface 72 of drive rollers 68.

Figure 2:
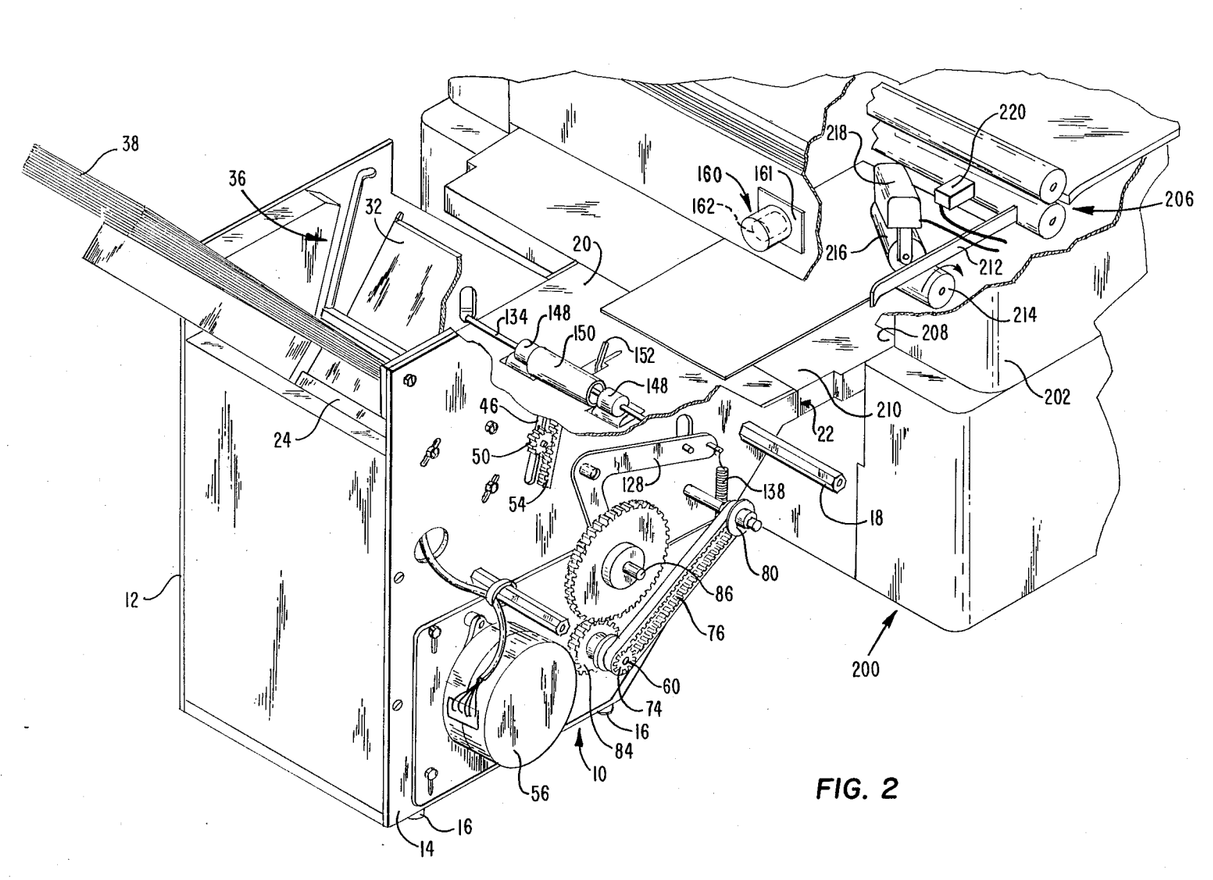
FIG. 2 is a perspective view similar to FIG. 1 showing the same feeder and processing machine from a different viewpoint, and with portions of the processing machine removed for clarity of illustration.

Two supply bias rollers 148 are rotatably mounted on carrier shaft 134 so that the supply bias rollers can rotate about the axis of the carrier shaft but cannot move transversely to the carrier shaft. Supply bias rollers 148 are aligned with drive rollers 68. When the arms and carrier shaft 134 are in the engaged position, supply bias rollers 148 bear upon drive rollers 68 under the influence of biasing springs 138, so that the supply bias rollers 148 define nips with the drive rollers 68. When the arms 126 and 128 and carrier shaft 134 are in the disengaged position, supply bias rollers 148 are elevated above and away from drive rollers 68. A tubular assist bias roller 150 surrounds shaft 134 between supply bias rollers 148. As best seen in FIG. 2, the interior diameter of tubular roller 150 is greater than the diameter of shaft 134. Therefore, roller 150 is movable upwardly and downwardly with respect to carrier shaft 134, and this tubular roller 150 will be biased downwardly at all times under the influence of its own weight. Regardless of whether the arms 126 and 128 and carrier shaft 134 are in the engaged (downward) or disengaged (upward) position, assist bias roller 150 will always bear on drive rollers 68. Also, as the assist bias roller 150 is only loosely held on carrier shaft 134, the assist bias roller can cock or skew slightly from its normal laterally extensive disposition as indicated at 150 in FIG. 5.

A path sensor 152, capable of detecting the presence of an envelope or other item on platform 20 is positioned immediately downstream from drive rollers 68. A home position sensor 154 is mounted adjacent the left-hand end of shaft 86. An indicator disk 156 having a marker slot 158 at one point on its periphery is fixed to countershaft 86 so that the indicator disk will rotate as a unit with unit 92 and large gear 88. Home position sensor 154 is arranged to provide a home signal when marker slot 158 is aligned with the signal and a different, out-of-home signal when the marker slot is not aligned with the sensor.

Figure 6:
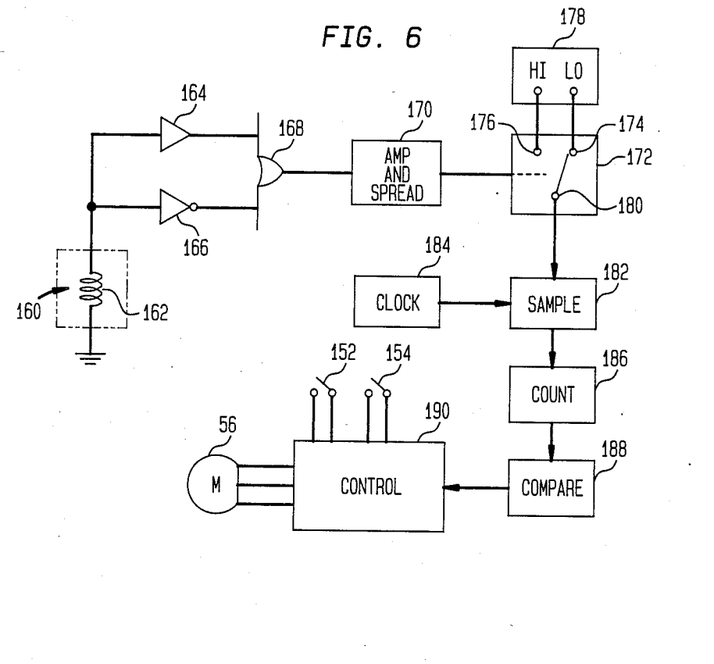
FIG. 6 is a schematic electrical diagram, partially in block form, showing certain electrical circuitry incorporated in the feeder of FIGS. 1-5.

A pickup 160 (FIGS. 1 and 2) is provided as well. Pickup 160 includes a housing and adhesive means, such as a piece of double-face tape 161 are provided for securing the housing of the pickup to the housing of a processing machine. Pickup 160 also includes a sensing conductor in the form of a coil 162. As shown in FIG. 6, one end of sensing conductor or coil 162 is connected to ground, whereas the opposite end is connected to the input of a unity gain operational amplifier 164 and to the input of a negative unity gain inverting operational amplifier 166. The outputs of these amplifiers are connected to the inputs of an OR gate 168, and the output of the OR gate is in turn connected to an amplifying and pulse-width spreading system 170. The output of this amplification and spreading system is connected as the control input to a flip-flop or bistable device 172. Flip-flop 172 has low and high input terminals 174 and 176, which are connected respectively to high and low potentials supplied by a potential source 178. The flip-flop also has an output node 180. In one state of flip-flop 172, the output node is connected to terminal 174, and hence to the low potential, whereas in the other state of the flip-flop the output node 180 is connected to terminal 176 and hence to the high potential.

A sampling unit 182 is connected to the output node 180 of flip-flop 172. Sampling unit 182 is driven by a clock 184. A counter 186 is connected to sampling unit 182 and a comparison unit 188 is connected to the counter 186. These electronic components are not normally made as discrete physical elements, but rather are all portions of a common microprocessor or microcontroller. The microcontroller also includes master control logic unit 190. The master control unit is arranged to accept a signal from comparator 188 and also to accept signals from path sensor 152 and home position sensor 154. The control unit is adapted to control the motor 56 as described hereinbelow.

Figure 1:
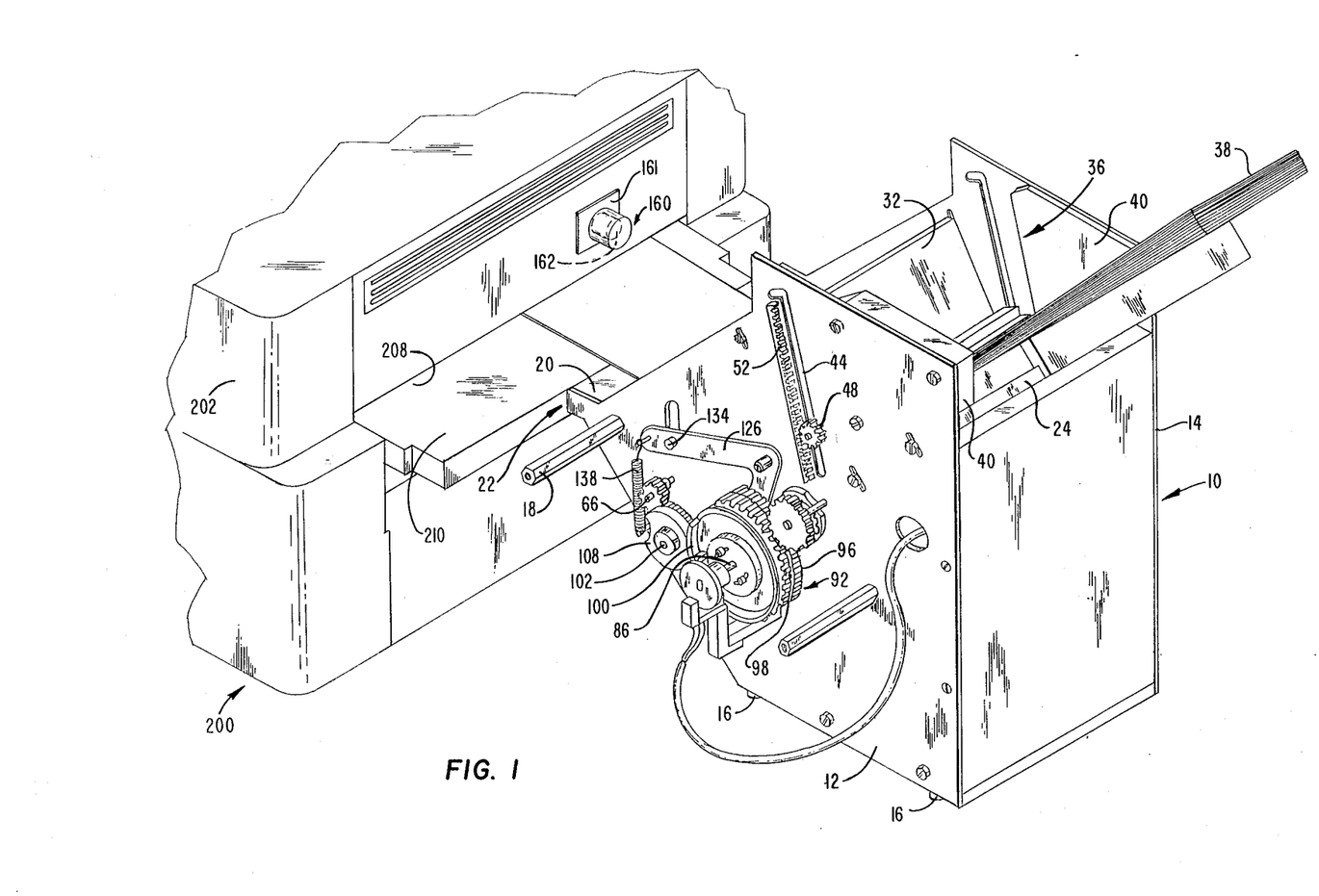
FIG. 1 is a perspective view showing a feeder in accordance with one embodiment of the present invention, in conjunction with a sheet processing machine, portions of the feeder being removed for clarity of illustration.

The feeder in accordance with this embodiment of the present invention can be utilized with a sheet processing machine such as a printer 200 (FIGS. 1 and 2). The printer has a housing 202 enclosing its operative elements and devices schematically indicated at 206 defining a paper handling path. The printer has internal paper storage elements (not shown) and appropriate devices for feeding paper from this internal supply through path 206 to printing elements. The printer is also arranged to accept manually fed sheets. For this purpose, the housing has a manual feed port 208 in one wall, and a platform 210 is provided at this opening. Between the upstream end of paper path 206 and feed port 208, the printer has an intake device including an alignment guide 212, an advance roller 214 and an alignment roller 216. Alignment guide 212 extends in the upstream to downstream direction of the printer, whereas the axis of advance roller 214 extends transversely to this upstream to downstream direction. Alignment roller 216 is disposed above advance roller 214, and the axis of advance roller 216 is disposed at an oblique angle to the axis of roller 214. A solenoid 218 is connected to the central control unit of the printer (not shown), the solenoid being arranged to hold alignment roller 216 upwardly, away from advance roller 214 in an inoperative position or to lower roller 216 into an operative position bearing on roller 214. The intake device of the printer also includes a sensor 220 connected to the central control unit if the printer.

In operation, the feeder is placed on the same table top surface as support printer 200, so that the downstream end 22 of the path defined by frame 10 is juxtaposed with the intake device of the printer. The frame is designed so that the dimension from the bottom of feet 16 to the top of platform 20 is the same as the dimension from the bottom of printer 200 to platform 210. Thus, with the downstream end 22 of the feeder frame abutting the upstream end of platform 210, the top surface of platform 210 is co-planar with the top surface of platform 20 in the feeder. Pickup 160 of the feeder is attached to the exterior surface of housing 202 by adhesive tape 161, so that the pickup lies adjacent solenoid 218. The feeder is then connected to an appropriate source of electrical power, such as a wall outlet (not shown). No other installation steps are generally required, and hence installation of the feeder at the printer can be performed by non-technical personnel.

A stack of envelopes 38 is loaded into bin 36, as by lifting weight 42 upwardly, placing the envelopes in the bin with the ends of the envelopes touching wall 32 and then lowering weight 42 downwardly onto the top of the stack, so that the weight presses the leading end of the lowermost envelope downwardly onto picker roll 124. When the feeder is at rest, and before operation of the feeder begins, countershaft 86 is at its home position. Home position sensing slot 158 is disk 156 (FIG. 3) is aligned with sensor 154. One of the C-shaped holding cam surfaces 118 on picker intermediate gear 114 is engaged with a mating arcuate surface on gear and cam unit 92, whereas a C-shaped holding cam surface 108 on intermediate supply gear unit 104 is likewise engaged with a mating cam surface on unit 92. Cams 90 and 94 on gear 88 and unit 92, respectively, engage followers 142 and 140 so as to hold arms 128 and 126 upwardly, in their respective disengaged positions and thus maintain carrier shaft 134 in its disengaged position with supply bias rollers 148 remote from drive rollers 68.

When power is first supplied to control unit 190, the control unit tests the position of path sensor 152. Inasmuch as no envelope is present, the sensing arm of sensor 152 will be in its up position, protruding above platform 20. This signals the control unit 190 to initiate an initial supply cycle. The control unit directs power to motor 56 and commands motor 56 to operate in the supply direction, spinning power shaft 60 in its supply cycle direction, counterclockwise as seen in FIG. 4 (arrow 64). As soon as power shaft 60 begins to rotate in its supply direction, the clutch elements within supply power gear 84 (FIG. 4) engage, causing gear 84 to rotate with the power shaft in the counterclockwise direction and hence causing gear 88 to rotate as well, clockwise as seen in FIG. 4. This rotation of gear 88 caused countershaft 86 to rotate as well, thus causing gear and cam unit 92 and disk 156 to rotate in the counterclockwise direction as seen in FIG. 3, so that home position slot 158 moves away from sensor 154. Promptly after this rotation begins, arcuate holding cam surface 118 on picker intermediate gear assembly 114 disengages from the mating surface on unit 92. Sector gear 96 (FIG. 5) on assembly unit 92 engages the teeth of picker intermediate gear assembly 114, thus causing the picker intermediate gear assembly to rotate in the clockwise direction, thereby spinning picker pinion 122, picker shaft 120 and picker roller 124 counterclockwise, all as seen in FIG. 3. This rotation of the picker roller 124 causes the picker roller to urge the lowermost envelope forwardly, in the downstream direction along the path, so that the lowermost envelope is discharged from bin 36, the remaining envelopes being retained by wall 32. The discharged envelope passes downwardly and forwardly until it encounters platform 20 whereupon the leading edge of the envelope moves forward along the platform. With continued rotation of countershaft 86 in the same direction, the cams 90 and 94 on gear 88 and on cam and gear unit 92 allow arms 126 and 128 to drop back towards their respective engaged positions under the influence of biasing springs 138, thus bringing the carrier shaft 134 to its engaged position and allowing supply bias rollers 148 to bear against the peripheral or drive surfaces of drive rollers 68.

With further rotation of the countershaft in the same direction, C-shaped holding cam surface 108 on drive roller intermediate gear 104 disengages, and the teeth 106 on this unit are engaged by sector gear 98 on cam and gear unit 92. This cuases the supply drive pinion 110 to begin spinning in the counterclockwise direction as seen in FIg. 3, thus driving drive roller shaft 66 in the same direction. The unidirectional clutch within assist sprocket 80 freewheels to permit this motion. Thus, the peripheral surfaces 72 of drive rollers 68 begin moving downstream.

The ratios of the various gears and gear sectors, and the diameters of picker roller 124 and drive rollers 68 are selected so that the peripheral speed of the drive roller surfaces 92 is just slightly higher than the peripheral speed of the picker roller surface during this portion of the supply cycle. For example, the drive roller peripheral speed during this portion of the cycle may be about 3.33 inches per second, whereas the peripheral speed of the picker roller may be about 3.26 inches per second. Thus, as the lowermost envelope envelope from the stack moves downstream under the influence of picker roller 124, the leading portion of the envelope will be engaged between supply bias rollers 148 and the peripheral surfaces 72 of drive rollers 68, and hence will be pulled through the nip between these rollers. The envelope thus will continue its advance downstream along the path defined by the feeder at a predetermined supply speed corresponding to the speed of the drive roller peripheral surface. After the drive roller begins moving at the predetermined supply speed, and after the leading edge of the envelope is engaged in the nip at the drive rollers, the arcuate gear segment 96 on cam and gear unit 92 moves out of engagement with the teeth on picker intermediate gear assembly 114, and one of the C-shaped cam surfaces 118 on this assembly moves into engagement with the mating arcuate surface on unit 92, thus arresting motion of picker intermediate gear 114 and picker pinion 122. At this time, the leading edge of the envelope is engaged with drive rollers 68 but the trailing edge of the envelope is still in contact with picker roller 124. Because gear unit 92, intermediate supply gear 104 and supply drive pinion 110 continue to turn drive roller shaft 66 and hence drive rollers 68. Thus, the envelope will continue to advance downstream at the predetermined supply speed. The picker roller 124 and picker roller shaft 120 will continue to turn as well, inasmuch as the unidirectional clutch elements within picker roller pinion 120 allow the picker roller 124 to continue its motion even though pinion 122 is stopped. However, as soon as the trailing edge of the lowermost envelope in the stack, being fed downstream on this cycle, passes downstream of the picker roller, the motion of picker roller 124 will stop. Therefore, the picker roller 124 will not feed more than one envelope on a cycle.

As power shaft 60 continues to turn in the same supply direction indicated by arrow 64, and as countershaft 86 and unit 92 continue to turn, sector gear 98 on unit 92 moves out of engagement with the teeth on intermediate supply gear unit 104. One of the C-shaped arcuate surfaces 108 of unit 104 will engage the corresponding arcuate surface on unit 92, thus arresting movement of this unit 104 and supply drive pinion 110. As drive roller shaft 66 and drive rollers 68 are no longer impelled in rotation, they stop and the envelope stops as well. At this point in the cylce, the envelope initially fed from the bin by the picker roller has advanced to the ready position, in which a portion of the envelope adjacent its trailing edge is engaged between the drive roller 68 and supply bias rollers 148, whereas the leading edge of the envelope protrudes downstream from the drive roller, beyond the downstream end of path 22 and into the intake device of printer 200. In this ready position, the envelope engages switch 152 and holds the sensing arm of the switch down, thus indicating that the envelope is present, and the envelope also protrudes between guide roller 216 and advance roller 214 of the printer. The envelope in the ready position is engaged with the sensor 220 of the printer as well. At this point, however, the envelope typically is not precisely aligned with guide rail 212 of the printer intake device.

Motor 56 continues to turn power shaft 60 and hence countershaft 86 in the same direction for a short time after rotation of the drive rollers stops. During this portion of the cycle, rotation of gear 88 and of gear unit 92 causes cams 90 and 94 to engage followers 142 and 140 and swing arms 126 and 128 upwardly against the bias of springs 138. Thus, the arms and the carrier shaft 134 move upwardly, away from drive rollers 68 to the disengaged position. Supply bias rollers 148 are disengaged from the envelope. However, because tubular assist bias roller 150 is only loosely engaged with shaft 134, the assist bias roller does not move upwardly with the carrier shaft. Therefore, the assist bias roller 150, under the influence of its own weight, continues to bear on the envelope. The assist bias roller thus lightly biases the envelope downwardly onto the drive surfaces 72 of drive rollers 68. Immediately after the carrier shaft has moved to the disengaged position in this fashion, continued rotation of countershaft 86 brings home position slot 158 (FIG. 3) in disk 156 into registration with sensor 154. The sensor transmits the home signal to control unit 190, whereupon the motor 56 is stopped.

The feeder will remain idle, with an envelope at the ready position and with the carrier shaft in the disengaged position, until such time as the printer 200 actuates the intake device. Such actuation typically occurs in response to an internal signal generated within the printer, as for example, in response to a command transmitted to the printer by a linked computer or word procesing unit. Upon receipt of such a command and provided that sensor 220 (FIG. 2) within the printer detects presence of an item at the sensor ready for processing, the central control unit of the printer will command solenoid 218 to drop alignment roller 216 downwardly, towards advance roller 214 thereby to begin the intake operation. Such a command necessarily changes the electric current passing through solenoid 218, typically by starting a sudden flow of current through the solenoid or by interrupting a flow of current normally occurring in solenoid 218. Such change necessarily produces a change in the magnetic filed surrounding the solenoid, and hence a change in the magnetic field at pickup 160. This change in the magnetic field at pickup 160 produces a current surge within coil 162. If the current surge in coil 162 is in a first direction, the output of amplifier 164 will momentarily change to a positive or high level, whereas the output of inverting amplifier 166 will go negative or low. The opposite changes occur if the current surge induced in the coil by the change in magnetic field is in the opposite direction. Regardless of the direction of the voltage surge produced within coil 162, however, one output of either amplifier 164 or inverting amplifier 166 will be momentarily positive or high upon operation of the solenoid. Thus, the output of OR gate 168 will also be momentarily positive or high. This signal is amplified and converted from a momentary spike to a pulse of predetermined duration by amplifier and spreading unit 120. This output is passed as the control signal to bistable or flip-flop 172, and causes the bistable or flip-flop to change the connection of output node 180 from one input terminal to the other. Normally, in the absence of a pulse, the output of flip-flop 180 is connected to high level input node 176. However, when a pulse occurs, output node 180 is connected to low level input node 174 and hence transmits a low level signal to sampling unit 182. Absent any other pulse or voltage spike on sensing coil 162, this low level signal will be continually supplied to the sampling unit 182.

Sampling unit 182 continually tests the output from the output node 180 of flip-flop 172. Thus, at each clock interval timed by clock 184, the sampling unit either increments counter 186 (if the output from node 180 is low) or else reinitializes the count in unit 186 to 0 (if the output from node 180 is at the high level supplied by node 176). Thus, if a single voltage surge occurs on sensing coil 162, the count in counter 186 will simply increase on each clock cycle. Comparator 188 will continually compare the count in unit 186 with a predetermined value. When the count exceeds this predetermined value, the comparator 188 will pass a valid-actuation detector signal to control unit 190. This indicates that the printer has in fact actuated the intake device. Typically, in the case of a valid actuation, there is only one sudden change in magnetic field and hence only one voltage surge on sensing coil 162. Conversely, in the case of some magnetic interference as may be caused for example, by operation of other electrical devices in the vicinity of the printer and feeder, there will be a series of voltage surges on sensing conductor 162, so that the output at node 180 will continually slew back and forth between the high potential and low potential levels of nodes 176 and 174, and the count in counter 186 will be reset by sampling unit 182 before reaching the predetermined value required to produce the detector signal.

When the detector signal is received by control unit 190, the control unit commands motor 56 to turn power shaft 60 in the assist direction indicated in broken lines by arrow 62 (FIG. 4). With the power shaft turning in this direction, the internal unidirectional clutch within gear 84 freewheels, so that countershaft 86 does not turn. However, the motion of power shaft 60 is transmitted through belt 76 to assist pulley 80, and the internal clutch units within this pulley transmit the motion of the pulley to drive roller shaft 66. The internal clutch unit within drive roller pinion 110 freewheels, thus permitting the drive roller shaft 66, and hence drive rollers 68 to turn in the clockwise direction as seen in FIG. 4 and hence to move the peripheral surfaces 72 of drive rollers 68 at opening 70 downstream. The ratio established by pulley 74, belt 76 and pulley 80 is different from the ratio established by the gears used to drive the drive roller shaft during the aforementioned supply cycle. Thus, in this assist mode the drive roller shaft turns relatively slowly, and hence the speed of drive roller peripheral surfaces 72 is lower in this assist mode. Typically, this assist speed is about 1.85 inches per second.

As will be appreciated, the assist speed movement of the drive roller is actuated substantially simultaneously with the internal actuation of the printer intake device. Thus, just as the drive rollers 68 begin turning in this assist mode, rollers 216 and 214 are engaged with the envelope and tend to pull the envelope into the printer and also to engage the edge of the envelope with guide rail 212. The drive rollers exert a relatively light downstream force on the envelope, assisting the envelope into the intake device of the printer. The assist speed or perpipheral speed of the drive roller in this mode typically is matched to the advance speed of the intake device in the printer. The feeder thus helps the printer draw the envelope into the intake device and dispatch the envelope downstream through the printer paper path.

Moreover, the feeder in this assist mode does not interfere with alignment of the envelope by the printer. If the feeder is slightly out of alignment with the paper path in the printer, as will normally be the case, the envelope will not be perfectly aligned with the rail 212 within the printer intake device at the start of the assist cycle. However, the envelope can be realigned with this rail by the normal action of printer alignment roller 216. Because the envelope is only lightly engaged with drive rollers 68 under the influence of the relatively light assist bias provided by the weight of tubular roller 150, the envelope is not firmly gripped by the feeder at this point, but is only lightly engaged with the drive rollers. Therefore, the envelope can cock or swing laterally with respect to the feeder. The freedom of assist bias roller 150 to swing or cock as indicated at 150' in FIG. 5 further facilitates this aligning motion. Accordingly, the feeder can be misaligned considerably with the paper path of the printer to an appreciable extent without casing any difficulty.

With continued downstream motion of the envelope into the printer, the trailing edge of the envelope will clear drive rollers 68 and then will clear switch 152. The sensing arm of sensor 152 pops to the up position indicating to control unit 152 that the envelope has now passed downstream from the ready position. In response to this outfeed signal, the control unit reverses the direction of rotation of motor 56, causing power shaft 60 to begin turning in the supply direction (arrow 64, FIG. 4). At this point, the sequence of operations described above begins once again. In this next supply cycle, the next envelope in the stack contained in bin 36 is fed from the stack and passed downstream along the path in exactly the same way as the first envelope. As the envelope in the supply cycle moves somewhat faster than the envelope engaged by the printer and taken in by the printer intake device, each envelope will tend to catch up with the preceding envelope during this portion of the cycle. However, because the trailing envelope starts out with its leading edge several inches behind the trailing edge of leading envelope, the trailing envelope does not hit the leading envelope. Desirably, by the time any particular envelope reaches the ready position and the supply cycle stops as described above, the leading edge of the envelope is no closer than about 0.5 inches to the trailing edge of the next preceding envelope. Thus, the trailing edge of each envelope clears sensor 220 within the printer intake device before the leading edge of the next succeeding envelope arrives. However, because each envelope is moved rapidly to the ready position, an envelope will be at the ready position almost as soon as the printer has finished taking the next preceding envelope. Thus, an envelope will be ready whenever the printer actuates the intake device.

If switch 152 does not trip to the up position within as predetermined time after the assist cycle starts, this would indicate a jam. Likewise, if the switch 152 does not return to the down position within a predetermined time after the start of a supply cycle, then the feeder may be out of envelopes or there may be a jam at the picker. In either case, the control unit 190 can provide an appropriate alarm, either via an audible or visible output device (not shown) or via feedback to the central computer.

As will be readily appreciated, numerous variations and combinations of the features described above can be utilized. Notably, although the invention has been described with reference to a particular embodiment suited for handling envelopes, those skilled in the art will realize from the foregoing description that the feeder can be adapted for use with substantially any other sheet like articles. For example, feeders according to the present invention can be used for feeding sheets of paper such as letterhead, index cards and the like. Also, the particular components employed in the unit can be varied considerably. Sensor switch 152 can be replaced by a photosensor, pneumatic sensor or other device for indicating that an item or article has moved downstream from the drive rollers. The mechanical components utilized to drive various elements in the feeders can be replaced with discrete drive motors, all operating under the control of a single control unit. The particular arrangement of assist bias roller 150 and supply bias rollers 148 on a common carrier shaft 134 is particularly useful, effective and inexpensive. However, this too can be varied, as by providing entirely separate biasing means, which may also be electrically actuated and under electrical control by the central control unit.

As these and other variations and combinations of the features described above can be utilized without departing from the invention as defined in the claims, the foregoing description of the preferred embodiments should be taken by way of illustration rather than by way of limitation of the invention as defined in the claims.

What is claimed is:

1. Apparatus for feeding sheetlike items into a processing machine having an electrically actuated intake device and means for intermittently actuating the intake device, the apparatus comprising:
   (a) detector means for detecting a change in magnetic field incident to actuation of said intake device and providing a detection signal in response to said change; and
   (b) assist means for advancing each item into said intake device in response to said detection signal.

2. Apparatus as claimed in claim 1 wherein said detector means includes a pickup and pickup mounting means for mounting said pickup outside of said processing machine.

3. Apparatus as claimed in claim 2 wherein said pickup includes a sensing conductor and said detector means includes circuit means for detecting voltage surges induced in said sensing conductor by changes in magnetic field.

4. Apparatus as claimed in claim 3 wherein said detector means includes debounce means for timing an interval starting from a first surge in voltage on said sensing conductor and providing said detection signal only when said timed interval exceeds a predetermined minimum interval without a further surge in voltage on said sensing conductor.

5. Apparatus as claimed in claim 4 wherein said circuit means includes a bistable device having two states, means for tripping bistable device from one of said states to the other of said states upon the occurrence of a voltage surge on said sensing conductor exceeding a predetermined threshold, and said debounce means includes means for checking the state of said bistable device at predetermined intervals and providing said detection signal only when said bistable device is in a first one of said states on each of a predetermined plural number of consecutive intervals.

6. Apparatus as claimed in claim 3 wherein said sensing conductor includes a conductive coil.

7. Apparatus as claimed in claim 6 wherein said pickup mounting means includes means for mounting said coil to an outside surface of a housing on said processing machine.

8. Apparatus as claimed in claim 1 further comprising supply means for holding a plurality of items and advancing one of said plurality of items to said assist means after each operation of said assist means.

9. Apparatus for feeding sheetlike items into a processing machine having an intake device operative to align each item to a predetermined orientation, the apparatus comprising:
   (a) a frame defining a path having upstream and downstream directions, said frame being adapted for mounting adjacent said processing machine with said downstream end of said path adjacent said intake device;
   (b) supply means for advancing a plurality of sheetlike items one by one downstream along said path to a predetermined ready position with each such item in an orientation corresponding generally to said predetermined orientation; and
   (c) assist means for urging each item downstream from said ready position into said intake device without substantially constraining the orientation thereof,
whereby said intake device can align each item to said predetermined orientation while downstream movement of the item is assisted by said assist means,
   the apparatus further comprising a drive element having a drive surface, said drive element being movably mounted to said frame so that said drive surface is disposed adjacent said path, and drive element movement means for moving said drive element so that said drive surface moves downstream, said assist means including assist bias means for biasing each item against said drive element with a predetermined assist bias force when the item is at or downstream of said ready position,
   said supply means including supply bias means for biasing each item against said drive surface of said drive element with a supply bias force greater than said assist bias force while the item is upstream of said ready position, whereby said drive element will operate both to move each item to the ready position and to urge the item downstream from said ready position,
   said drive element being positioned so that an item in said ready position will be in contact with said drive surface, the apparatus further comprising means for stopping said motion of said drive element when an item is at said ready position and means for restarting movement of said drive element upon operation of said intake device in said processing machine, whereby each item will be advanced to said ready position and will dwell at said ready position until said intake device is actuated,
   said supply means including reservoir means for holding a plurality of items to be fed and picker means for taking a single item from said plurality of items and advancing said single item downstream towards said drive element,
   the apparatus further comprising outfeed detector means for detecting movement of an item downstream from said ready position, generating an outfeed signal in response to such movement and actuating said picker means in response to said outfeed signal to advance the next item towards said drive element,
   said drive element movement means including assist movement means for moving said drive surface at a predetermined assist speed as each item is advanced downstream from said ready position, said reservoir being remote from said drive element, said picker means being operative to advance each item downstream towards said drive element at a speed greater than said assist speed, said drive element movement means including supply movement means for moving said drive surface at a predetermined supply speed greater than said assist speed as an item in contact with said drive surface moves downstream towards said ready position, said drive element movement means including a power shaft rotatably mounted to said frame, motor means for turning said power shaft either in a predetermined supply direction or in a predetermined assist direction opposite to said supply direction, assist power train means for connecting said drive element to said power shaft only upon rotation of said power shaft in a predetermined assist direction, supply power train means for connecting said drive element to said power shaft only upon rotation of said power shaft in a predetermined supply direction opposite to said assist direction, said assist power train means and said supply power train means providing different ratios between movement of said drive surface and rotation of said power shaft.

10. Apparatus for feeding sheetlike items into a processing machine having an intake device operative to align each item to a predetermined orientation, the apparatus comprising:

(a) a frame defining a path having upstream and downstream directions, said frame being adapted for mounting adjacent said processing machine with said downstream end of said path adjacent said intake device;

(b) supply means for advancing a plurality of sheetlike items one by one downstream along said path to a predetermined ready position with each such item in an orientation corresponding generally to said predetermined orientation; and (c) assist means for urging each item downstream from said ready position into said intake device without substantially constraining the orientation thereof, whereby said intake device can align each item to said predetermined orientation while downstream movement of the item is assisted by said assist means, the apparatus further comprising a drive element having a drive surface, said drive element being movably mounted to said frame so that said drive surface is disposed adjacent said path, and drive element movement means for moving said drive element so that said drive surface moves downstream, said assist means including assist bias means for biasing each item against said drive element with a predetermined assist bias force when the item is at or downstream of said ready position, said supply means including supply bias means for biasing each item against said drive surface of said drive element with a supply bias force greater than said assist bias force while the item is upstream of said ready position, whereby said drive element will operate both to move each item to the ready position and to urge the item downstream from said ready position, said supply bias means including a carrier mounted to said frame for movement between engaged and disengaged positions, said carrier being closer to said drive surface in said engaged position than in said disengaged position, carrier bias means for urging said carrier towards said engaged position, bias selector means for holding said carrier in said disengaged position, a member mounted to said carrier so that said member is urged towards said drive element when said carrier is urged towards said engaged position by said carrier bias means, said member being remote from said drive element when said carrier is in said disengaged position, said assist bias means including an assist bias element mounted to said carrier for movement relative to said carrier towards and away from said drive element and means for urging said assist bias element towards said drive element so that said assist bias element can engage items advanced between said assist bias element and said drive element when said carrier is in said disengaged position.

11. Apparatus as claimed in claim 10 wherein said carrier is mounted above said drive element and said means for biasing said assist element relative to said carrier includes the weight of said assist bias element.

12. Apparatus as claimed in claim 11 wherein said carrier includes a laterally extensive carrier shaft defining a carrier shaft axis, said member includes a supply bias roller mounted to said carrier shaft for rotation about said carrier shaft axis, said supply bias roller being constrained against movement relative to said carrier shaft transverse to said carrier shaft axis, and said assist bias element including a tubular assist bias roller loosely encircling said carrier shaft.

13. Apparatus as claimed in claim 10 wherein said assist bias element includes an assist bias roller having a bias roller axis, the assist bias roller being mounted to said carrier so that said assist bias roller is rotatable about said assist bias roller axis, so that said assist bias roller axis is movable with respect to said carrier towards and away from said drive element, and so that said assist bias roller axis extends generally laterally but is movable over a limited angular range with respect to said carrier.

14. Apparatus as claimed in claim 10 wherein said drive element includes a drive roller having a drive roller axis extending substantially laterally, said drive element movement means including means for rotating said drive roller about said drive roller axis.

* * * * *

UNITED STATES PATENT AND TRADEMARK OFFICE
CERTIFICATE OF CORRECTION

PATENT NO. : 4,778,169

DATED : October 18, 1988

INVENTOR(S) : Fazio et al.

It is certified that error appears in the above-identified patent and that said Letters Patent is hereby corrected as shown below:

```
Column  2, line 36, "detecting" should read --detection--.
Column  3, line 40, "wtih" should read --with--.
Column  3, line 43, "time" should read --item--.
Column  5, line 46, after "wall 24" insert --also--.
Column  8, line  2, "surface" should read --surfaces--.
Column  9, line 65, "is" (first occurrence) should read --in--.
Column 10, line 24, "caused" should read --causes--.
Column 10, line 66, "92" should read --72--.
Column 12, line 38, "filed" should read --field--.
Column 14, line 47, after "taking" insert --in--.
Column 14, line 50, "as" should read --a--.
Column 17, line 37, "dowstream" should read --downstream--.
```

Signed and Sealed this

Fourth Day of April, 1989

Attest:

DONALD J. QUIGG

Attesting Officer

Commissioner of Patents and Trademarks